B. LEACH.
TIP MEASURING MACHINE.
APPLICATION FILED MAY 26, 1911.

1,098,274.

Patented May 26, 1914.

Witnesses:
Wills A Burrowes.
Walter Chism

Inventor:
Benjamin Leach.
by his Attorneys.
Howson & Howson

COLUMBIA PLANOGRAPH CO., WASHINGTON, D. C.

UNITED STATES PATENT OFFICE.

BENJAMIN LEACH, OF VINELAND, NEW JERSEY, ASSIGNOR TO THE KEIGHLEY COMPANY, OF VINELAND, NEW JERSEY, A CORPORATION OF NEW JERSEY.

TIP-MEASURING MACHINE.

1,098,274.      Specification of Letters Patent.      Patented May 26, 1914.

Application filed May 26, 1911. Serial No. 629,702.

*To all whom it may concern:*

Be it known that I, BENJAMIN LEACH, a citizen of the United States, and a resident of Vineland, Cumberland county, New Jersey, have invented certain Improvements in Tip-Measuring Machines, of which the following is a specification.

My invention relates to that class of devices particularly intended for indicating to a shoe laster whether the various parts of a shoe are properly arranged and proportioned, one object of the present invention being to provide a tip measuring machine whereby it shall be possible for the laster to determine at a glance whether the tips of two shoes are properly mated and whether said tips are straight or crooked, long or short, etc.

Another object of the invention is to provide a measuring or indicating device of the class noted, which shall be simple and compact in construction, inexpensive to make and convenient to use.

These objects and other advantageous ends I secure as hereinafter set forth, reference being had to the accompanying drawings, in which:—

Figure 1:
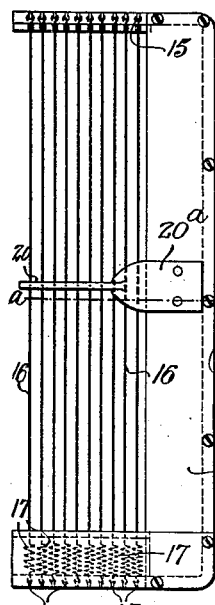
Figure 1:
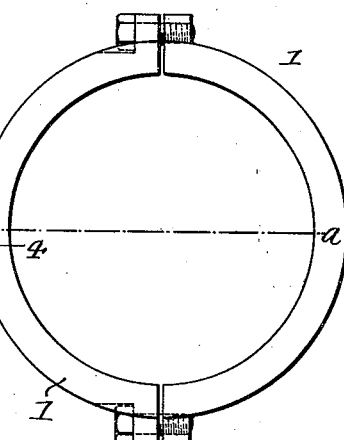
Figure 2:
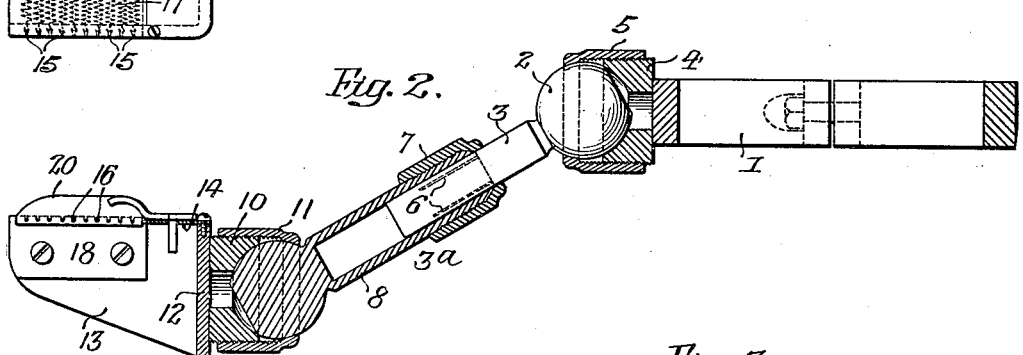
Figure 3:
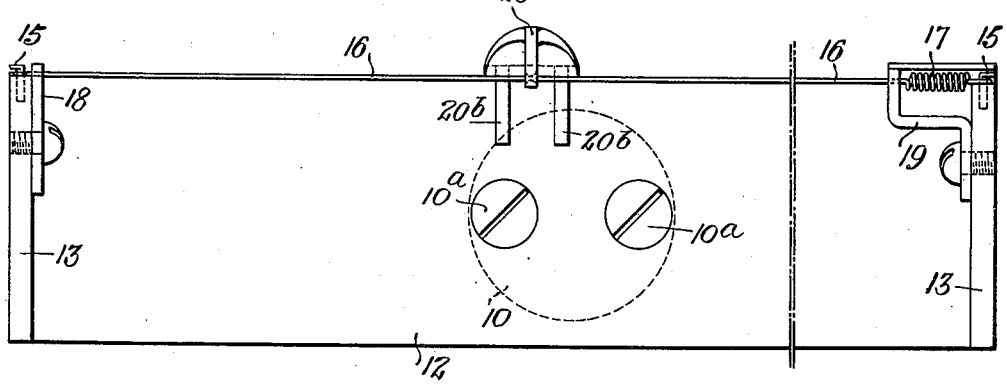

Figure 1, is a plan of a tip measuring machine constructed according to my invention; Fig. 2, is a longitudinal vertical section on the line $a$—$a$ Fig. 1, and Fig. 3, is a front elevation on an enlarged scale, further illustrating the device shown in Fig. 1.

In the above drawings 1 represents a clamping yoke designed for attachment to the post or column of a pulling-over or lasting machine, although it is obvious that it may be formed to be mounted on any suitable supporting structure. This yoke on one side is provided with a socket for a ball 2 at one end of the part 3 of a rod $3^a$ and such socket consists of a projection 4, in the present instance integral with part of the clamping yoke, provided with a semi-spherical recess and threaded for the reception of a nut 5 forming part of the socket.

The part 8 of the rod $3^a$ is made tubular and is provided with a number of longitudinal slots 6, being tapered and threaded as illustrated in Fig. 2, for the reception of a nut 7 which is likewise provided with an interior tapered and threaded recess. One end of the part 3 of the rod extends through this nut into the tubular part 8 so as to telescope therewith, and as is obvious, these parts of the rod may be moved longitudinally relatively to each other and thereafter clamped in any adjusted position by properly setting up the nut 7, which thus tightens the slotted threaded end of the part 8 on the adjacent portion of the part 3.

The opposite end of the part 8 is provided with a ball removably fitting a socket similar to that receiving the ball 2 and like it, consisting of a recessed lug 10 and a retaining nut 11. Connected with the member 10, in this case by means of screws $10^a$, is a frame formed by an elongated end member 12 and two side members 13 forming an open E-shaped structure which has preferably fixed to its upper edge a flat forwardly extending plate 14, as shown in Fig. 1.

On the top edges of the side members 13 are mounted two series of pins 15, constituting a number of pairs between the pins of each of which is stretched a thin wire 16, including adjacent to one of its ends a spring 17, in order that it may be at all times maintained tightly stretched. For accurately spacing these wires at predetermined distances from the front face of the part 12 of the frame and from each other, I provide two plates 18 and 19, mounted on the inner faces of the side members 13 of the frame and having their upper edges notched for the reception of the various wires 16, said edges being preferably numbered in any desired manner not shown and the plate 19 being offset to accommodate the springs 17. In addition there is a third spacing plate 20 mounted to engage the wires at substantially their central parts and provided with a series of holes for their reception. The rear end $20^a$ of this plate is found to be parallel with the plate 14 to which it is movably held by two pins $20^b$. With this arrangement of parts an operator desiring to ascertain whether the tips of a pair of shoes are properly mated, places them with the toes extending under the wires 16 and in engagement with the front or inner face of the member 12 of the frame, at the same time moving said toes upwardly until they engage the under side of the plate 14.

As is obvious, if the rear ends of the tip portions are immediately under or the same distance from one of the wires 16, they are properly mated, but if there is any difference either in length or form, this is evident at a glance, since said wires constitute lines or members to which the eye naturally refers the various parts of the tip which may differ for any reason in their proportions or arrangement. The wires and their springs are usually so designed as to permit of the former moving upward to conform to the shape of the tips to a limited extent and the spacing plate 20 is free to move with said wires while at all times holding them parallel. For this purpose the pins 20ᵇ serve as guides.

The provision of the ball and socket joints between the rod 3ᵃ and the yoke 1 and the frame 12—13, permits the latter to be swung into a position such as will permit the tips of shoes being conveniently introduced for comparison or measurment, while in addition it is possible to adjust the combined lengths of the parts 3 and 8 of said rod to bring the frame to the proper position to suit operators of various heights or to meet other conditions.

As will be obvious to those skilled in this art, the wires 16 are not necessarily of metal of circular section since they may, if desired, be of other forms of section and may be made to be relatively inflexible without departing from my invention although they are preferably flexible. One essential feature of the invention however resides in the provision of a series of substantially parallel reference members mounted at definite and preferably predetermined distances from the tip engaging or receiving surface formed by the front face of the part 12 of the frame with whose general plane said reference members are parallel.

In some cases certain ones of the wires or reference members are made of a metal or other substance whose color is different from that of the remaining members, as for example, the fifth and eighth wires may be of brass while the others are of steel. With this arrangement an operator is enabled to more easily and quickly note differences in the proportions and dimensions of the tips to be measured or compared.

I claim:—

1. A tip measuring device consisting of a supporting frame open on one side and having a member opposite said side constituting an abutment; with a series of substantially parallel, longitudinally fixed reference members extending between opposite parts of the frame and substantially parallel to said abutment.

2. A tip measuring device consisting of a supporting frame having a portion placed to serve as a reference member and a plurality of parallel wires permanently fixed across said frame in positions to permit of the presentation to them of the tips of shoes.

3. A tip measuring device consisting of open sided supporting frame and a spring stretched member extending between opposite sides of said frame at a predetermined distance from a portion thereof against which the end of a tip may be placed.

4. A tip measuring device consisting of a supporting frame having a portion for engagement by the end of a tip and a spring stretched member extending across said frame at a predetermined distance from a portion thereof against which the end of a tip may be placed.

5. A tip measuring device consisting of a supporting frame and a plurality of relatively thin independent reference members permanently fixed across said frame at predetermined distances from a portion of said frame formed to serve as an abutment for the tips of shoes.

6. A tip measuring device consisting of a supporting frame and a plurality of independent reference members permanently fixed across said frame at predetermined distances from a portion thereof formed to serve as an abutment for the tips of shoes, certain of the reference members having an appearance different from the others.

7. The combination in a tip measuring machine of a frame having a portion for the reception of the tips of shoes and a series of substantially parallel wires stretched across said frame at definite distances from said tip receiving portion thereof; with springs for retaining said wires under tension.

8. A tip measuring machine consisting of a frame having a portion for the reception of the tips of shoes; a plurality of relatively thin independent reference members fixed against longitudinal movement on said frame for indicating the distance of various portions of the shoe from the tip thereof when the latter is engaged with the said receiving portion; and means for adjustably supporting said frame.

9. The combination in a tip measuring machine of a supporting frame; a bar having a ball and socket connection therewith; a frame having a ball and socket connection with said bar; a series of parallel wires mounted on the latter frame at predetermined distances from a portion thereof forming a reference surface, said bar being made in two longitudinally adjustable sections; and means for maintaining said sections in any adjusted position.

10. A tip measuring machine consisting of a frame having side portions connected by a portion having a surface for reception of the tips of shoes; a series of substantially parallel wires stretched between said side portions; and means in addition to said frame portions for maintaining said wires spaced at predetermined distances apart.

11. A tip measuring machine consisting of a supporting frame having a series of wires stretched between two of its opposite parts; spacing plates mounted on said frame adjacent said wire supporting parts to maintain said wires at predetermined distances from each other, one of said plates being offset from the adjacent part of said structure; and a series of springs respectively connected to the various wires between said plate and the adjacent portion of the supporting frame to maintain the wires under tension.

In testimony whereof, I have signed my name to this specification, in the presence of two subscribing witnesses.

BENJAMIN LEACH.

Witnesses:
W. B. KEIGHLEY,
W. E. HUGHES.

Copies of this patent may be obtained for five cents each, by addressing the "Commissioner of Patents, Washington, D. C."